United States Patent
Ramachandran et al.

(10) Patent No.: US 9,480,946 B2
(45) Date of Patent: Nov. 1, 2016

(54) METAL CARBOXYLATE SALTS AS H2S SCAVENGERS IN MIXED PRODUCTION OR DRY GAS OR WET GAS SYSTEMS

(71) Applicant: Baker Hughes Incorporated, Houston, TX (US)

(72) Inventors: Sunder Ramachandran, Sugar Land, TX (US); Scott E. Lehrer, The Woodlands, TX (US); Vladimir Jovancicevic, Richmond, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 208 days.

(21) Appl. No.: 14/221,501

(22) Filed: Mar. 21, 2014

(65) Prior Publication Data

US 2014/0305845 A1 Oct. 16, 2014

Related U.S. Application Data

(60) Provisional application No. 61/811,951, filed on Apr. 15, 2013.

(51) Int. Cl.
| | |
|---|---|
| *C10G 27/10* | (2006.01) |
| *B01D 53/14* | (2006.01) |
| *C10G 21/00* | (2006.01) |
| *C10G 21/12* | (2006.01) |
| *C10G 21/16* | (2006.01) |
| *C10G 17/09* | (2006.01) |

(52) U.S. Cl.
CPC ....... *B01D 53/1468* (2013.01); *B01D 53/1493* (2013.01); *B01D 2252/205* (2013.01); *B01D 2257/306* (2013.01)

(58) Field of Classification Search
CPC ...... C10G 17/09; C10G 21/00; C10G 21/12; C10G 21/16; C10G 27/10
See application file for complete search history.

(56) References Cited

U.S. PATENT DOCUMENTS

| 2,584,041 A | 1/1952 | Nowak et al. |
|---|---|---|
| 3,367,869 A | 2/1968 | Silver et al. |
| 4,902,408 A * | 2/1990 | Reichert ............ A62D 3/33 208/239 |
| 5,000,835 A | 3/1991 | Taylor et al. |
| 5,443,698 A | 8/1995 | Mahoney et al. |

(Continued)

FOREIGN PATENT DOCUMENTS

| EP | 0 121 377 A1 | 10/1984 |
|---|---|---|
| WO | 2009156618 A1 | 12/2009 |

OTHER PUBLICATIONS

Poshkus, Algirdas C., "Improved Synthesis of Basic Zinc Acetate, Hexakis (μ-acetato)-μ-oxatetrazinc," Ind. Eng. Chem. Prod. Res. Dev., No. 22, pp. 380-381 (1983).

Davidson, Eric et al., "An Environmentally Friendly, Highly Effective Hydrogen Sulphide Scavenger for Drilling Fluids," SPE 84313, 9 pp. (Oct. 2003).

Buller, J. et al., "H2S Scavengers for Non-Aqueous Systems," SPE 93353, 6 pp. (Feb. 2005).

(Continued)

*Primary Examiner* — Brian McCaig
(74) *Attorney, Agent, or Firm* — Mossman Kumar & Tyler PC

(57) ABSTRACT

A transition metal carboxylate scavenger may be used to scavenge contaminants from systems from mixed production and/or gas, either dry or wet hydrocarbon gas. The contaminants scavenged or otherwise removed may include, but are not necessarily limited to, $H_2S$, mercaptans, sulfides, and combinations thereof. Suitable transition metal carboxylates in the scavenger include, but are not limited to, zinc octoate, zinc dodecanoate, zinc naphthenate, and combinations thereof.

17 Claims, 1 Drawing Sheet

(56) References Cited

U.S. PATENT DOCUMENTS

| | | |
|---|---|---|
| 6,599,472 B1 | 7/2003 | Hudson |
| 8,246,813 B2 | 8/2012 | Compton et al. |
| 2003/0121824 A1* | 7/2003 | Wang .................. B01J 21/10 |
| | | 208/113 |
| 2005/0145137 A1 | 7/2005 | Buras et al. |
| 2008/0039344 A1* | 2/2008 | Devereux ............. B01D 53/52 |
| | | 507/103 |

OTHER PUBLICATIONS

Peterangelo, Stephen C., et al., "Correlation between Rheological Properties of Zinc Carboxylate Liquids and Molecular Structure," J. Phys. Chem. B. 111, pp. 7073-7077 (Apr. 2007).

Prigent M., "La Catalyse D'Epuration Des Gaz D'Echappement Automobiles. Situation Actuelle et Nouvelles Orientations," Oil & Gas Science & Technology: Revue de L'Institut Francais Du Petrole, Editions Technip. Paris, FR., vol. 51, No. 6, pp. 829-843 (Nov. 1, 1996).

* cited by examiner

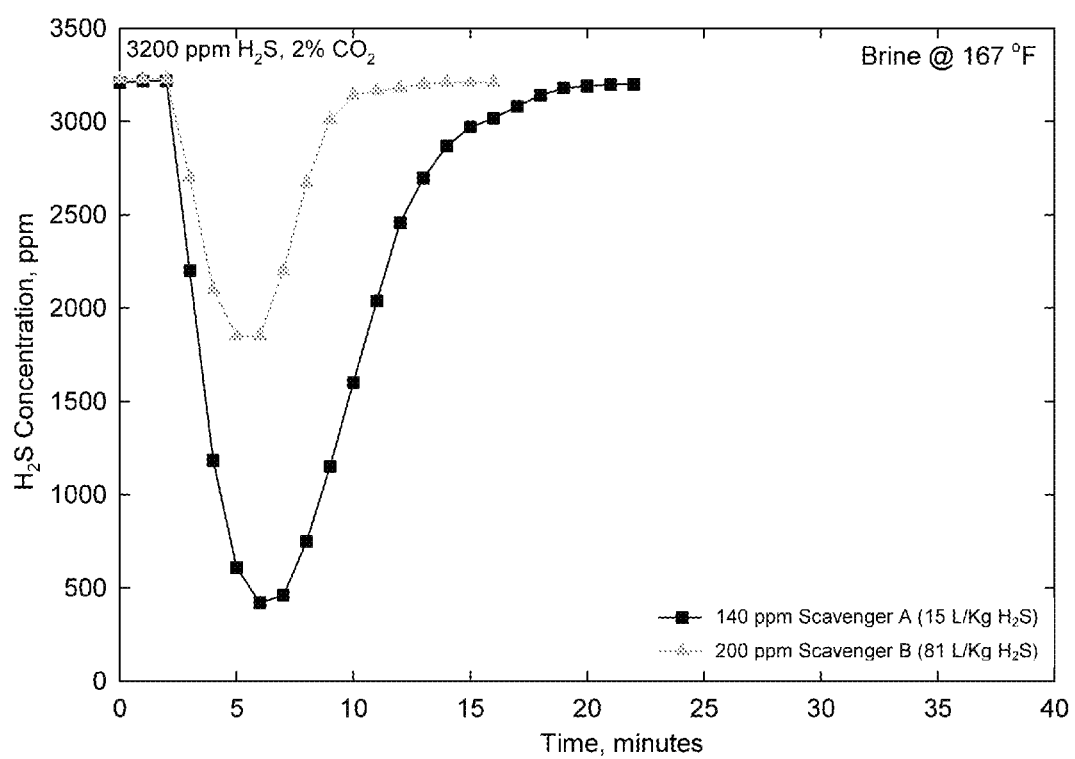

METAL CARBOXYLATE SALTS AS H2S SCAVENGERS IN MIXED PRODUCTION OR DRY GAS OR WET GAS SYSTEMS

CROSS-REFERENCE TO RELATED APPLICATION

This application claims the benefit of U.S. Provisional Patent Application Ser. No. 61/811,951 filed Apr. 15, 2013, incorporated herein by reference in its entirety.

TECHNICAL FIELD

The present invention relates to methods and compositions for scavenging contaminants from hydrocarbon and/or aqueous streams, and more particularly relates, in one non-limiting embodiment, to methods and compositions for scavenging $H_2S$, mercaptans, and/or sulfides, and/or cyanides from systems comprising mixed production systems and a dry hydrocarbon gas phase, and/or a wet hydrocarbon gas phase.

BACKGROUND

In the drilling, completions, production, transport, storage, and processing of crude oil and natural gas, including waste water associated with crude oil and gas production, and in the storage of residual fuel oil, contaminants are often encountered. Such contaminants may include, but are not necessarily limited to, hydrogen sulfide ($H_2S$), mercaptans, and/or sulfides. The presence of $H_2S$ and mercaptans is extremely objectionable because they are an acute health hazard and often highly corrosive. Still another reason that mercaptans are undesirable is that they have highly noxious odors. The odors resulting from mercaptans are detectable by the human nose at comparatively low concentrations and are well known. For example, mercaptans are used to odorize natural gas and used as a repellant by skunks and other animals.

Further, other of these contaminants in hydrocarbon gas and/or mixed production systems may cause various health, safety and environmental (HSE) concerns and/or corrosion issues during the production, storage, transportation and processing of oil and gas.

To eliminate these contaminants and potentially harmful species, various scavenger systems have been developed in the art. However, many of these systems have limitations, including, but not necessarily limited to, low reactivity and therefore low efficiency, containing atypical components or elements that may adversely affect fuel or fluid quality, or may present toxicity concerns themselves and/or as the consequent reaction products.

It should be understood that nearly all scavenging systems for removing $H_2S$, mercaptans and/or sulfides from oil-based systems such as crude oil, oil slurries, asphalt, and the like, cannot be assumed to work in mixed production systems or dry and/or wet hydrocarbon gas systems. "Mixed production systems" are defined herein to be predominantly water with some oil present, where the water is greater than about 50 wt % of the mixture, alternatively greater than about 60 wt % of the mixture, in another non-limiting embodiment greater than about 70 wt % of the mixture, in another non-restrictive version greater than about 80 wt % of the mixture, and still another alternative at least about 90 wt % of the mixture. In one non-limiting embodiment the amount of oil in a "mixed production system" may be up to about 10 wt %. A mixed production system may contain a hydrocarbon gas, such as natural gas. A "dry hydrocarbon gas system" is defined herein as a hydrocarbon gas produced from a subterranean formation having no more than about 7 lbs of water per mmscf (about 0.11 $gr/m^3$), alternatively no greater than about 1 lb of water per mmscf (about 0.016 $gr/m^3$), and in another non-limiting embodiment no greater than about 0.1 lbs of water per mmscf (about 0.0016 $gr/m^3$). "Wet hydrocarbon gas" is defined as a hydrocarbon gas (e.g. natural gas) that contains more than 7 lbs of water/mmscf (0.11 $gr/m^3$); in one non-limiting embodiment between about 50 independently to about 1,000 lbs water/mmscf (about 0.8 to about 16 $gr/m^3$), alternatively less than 10,000 lbs water/mmscf (160 $gr/m^3$). As defined herein "hydrocarbon" refers to naturally occurring hydrocarbons recovered from subterranean formations which are not necessarily limited to molecules having only hydrogen and carbon and which may include heteroatoms including, but not necessarily limited to oxygen, nitrogen, and sulfur.

In other words, it is not obvious or apparent that a scavenger that removes $H_2S$, mercaptans and/or sulfides from oil-based systems will do so for a mixed production system and/or a dry hydrocarbon gas system and/or a wet hydrocarbon gas system. Nearly all scavengers that work well for oil-based systems do not work, or do not work very well or very effectively for mixed production systems but might work for dry hydrocarbon gas systems and/or a wet hydrocarbon gas system; such scavengers include, and are not necessarily limited to, glyoxal, triazines and other amines. Many conventional $H_2S$ scavengers such as triazine work poorly in mixed production systems where the water content is above 20%. In addition to low effectiveness of these scavengers in mixed production systems the scaling and/or solid formation issues are often encountered.

Acrolein is the one well-known scavenger that is effective at scavenging $H_2S$, mercaptans and/or sulfides from oil-based systems as well as from a mixed production system, but acrolein is also well known to be very hazardous to handle and work with.

It would be desirable if methods and/or compositions could be devised that would, reduce, eliminate, take out or otherwise remove such contaminants from these mixed production and/or dry hydrocarbon gas systems, as well as reduce, alleviate or eliminate corrosion caused by these undesired contaminants.

SUMMARY

There is provided a method for at least partially scavenging a contaminant from a system selected from the group consisting of mixed production and/or a dry hydrocarbon gas and/or a wet hydrocarbon gas, where the method includes contacting the system with a transition metal carboxylate scavenger in an effective amount to at least partially scavenge a contaminant from the system, where the contaminant is selected from the group consisting of $H_2S$, a mercaptan, a sulfide and combinations thereof; and the system further includes at least partially scavenging the contaminant from the system.

There is additionally provided in another non-limiting embodiment a system treated for a contaminant selected from the group consisting of $H_2S$, a mercaptan, a sulfide and combinations thereof, where the system is selected from the group consisting of mixed production, wet hydrocarbon gas, and dry hydrocarbon gas, and where the system comprises a transition metal carboxylate scavenger in an effective amount to at least partially scavenge the contaminant from the system

BRIEF DESCRIPTION OF THE DRAWINGS

FIG. 1 is a graph demonstrating the change in $H_2S$ concentration vs. time with the injection of 200 ppm Scavenger A (a 16% zinc product as zinc octoate in an aromatic solvent) and Scavenger B (an oil-soluble amine/formaldehyde reaction product) in brine at 167° F. (75° C.).

DETAILED DESCRIPTION

It has been discovered that a transition metal carboxylate scavenger reacts with or "scavenges" or otherwise removes $H_2S$, mercaptans, and/or sulfides, from systems comprising water or predominantly water with oil, that is, mixed production and dry hydrocarbon gas and a wet hydrocarbon gas, such as hydrocarbon gas streams having some water, or which are predominantly water, where these contaminants may be present and/or produced from any source. Many of these contaminants may over time and/or under certain conditions contact other reactants and form undesirable corrosive products.

As defined herein, a hydrocarbon gas includes, but is not necessarily limited to, natural gas, further including, but not limited to methane, ethane and include higher molecular weight fractions and gas condensate. The term "hydrocarbon gas" is not limited to chemical compounds having only hydrogen and carbon atoms, but may include chemicals customarily referred to as "hydrocarbons" including, but not necessarily limited to, petroleum, crude oil, natural gas, asphaltenes, constituent parts thereof and the like. Some of the molecules may contain heteroatoms such as oxygen, nitrogen and sulfur.

In one non-limiting instance, contaminants such as hydrogen sulfide, mercaptans and sulfides are frequently present in many oilfield and refinery systems that comprise water and/or a hydrocarbon gas. Efforts to minimize or exclude the sulfides, mercaptans and hydrogen sulfide from such water-containing hydrocarbon gas systems and streams, particularly when water is a predominant part thereof, or where the hydrocarbon gas is essentially dry (having no appreciable water) are often ineffective or economically infeasible. Consequently, there is a need for another method of removing these contaminants from the systems or mixtures containing water or mixed production systems or a dry hydrocarbon gas and other such streams for health and environmental concern. Surprisingly, the transition metal carboxylate scavenger and method described herein is one such approach. It will be appreciated that in the context herein, the term "scavenger" encompasses a combination of components or additives, whether added to a stream separately or together, that scavenge one or more of the contaminants noted. It has also been surprisingly found that in these instances, the solids, if formed, are well dispersed in the water phase and easy to handle.

Scavenger chemistry described herein has been discovered to react with and "remove" these contaminants, that is, form a less-objectionable reaction product which may still remain in the stream but does not have the undesirable effects of the contaminant per se. For instance, the action of the transition metal carboxylate scavenger on the contaminants effectively at least partially (or completely) converts them into thermally stable higher molecular weight organometallic compounds.

It has been discovered that transition metal carboxylates are effective in reacting with these contaminants to produce compounds or products that will no longer cause difficulty or concerns, or at least are less objectionable than the contaminants per se. It should be understood that the process is not technically "removing" the contaminant. By "removing", the contaminant is converted into a product that will prevent it from presenting more concerns and problems than the original contaminant. The reaction between the transition metal carboxylate scavenger and the contaminant will form a thermally stable product that does not cause or present such serious concerns or problems.

In one non-limiting embodiment, the transition metal carboxylate scavenger may include transition metal ions selected from the group consisting of zinc, iron, copper, cobalt, calcium, manganese, etc., and the like, and combinations thereof. The transition metal may be complexed with a variety of carboxylic acids, including but not necessarily limited to octanoic acid, naphthenic acid, dodecanoic acid, acetic acid, mixed acids etc., and the like, and combinations thereof. Stated another way, in one non-limiting embodiment, the carboxylic acid complexed may have from 1 independently to 25 carbon atoms, in another non-limiting embodiment from 4 independently to 16 carbon atoms, in a different non-restrictive embodiment from 8 independently to 18 carbon atoms, and in an alternative embodiment may have from 6 independently to 12 carbon atoms. The use of the term "independently" with respect to a range herein means that any lower threshold and any upper threshold may be combined to give an acceptable alternative range for that parameter. The octanoic acid may more specifically be 2-ethylhexanoic acid. Zinc octoate is also referred to as zinc 2-ethylhexanoate. Other suitable transition metal carboxylates include but are not necessarily limited to zinc dodecanoate and zinc naphthenate, and combinations thereof. Combinations of these salts may be called "mixed acid salts".

Within the transition metal carboxylate scavenger at least one transition metal carboxylate may be present in a proportion of from about 10 independently to about 100 wt %, where the balance of from about 90 independently to about 0 wt % is aromatic solvent. In another non-limiting embodiment the transition metal carboxylate ranges from about 20 independently to about 95 wt % of the scavenger, where from about 10 independently to about 5 wt % is an aromatic solvent. Alternatively, the transition metal carboxylate scavenger is in a proportion ranging from about 60 independently to about 100 wt %, where the balance of from about 40 to about 0 wt % aromatic solvent, or in a different non-limiting embodiment from about 10 independently to about 30 wt % aromatic solvent. Generally some solvent is helpful for handling and delivering the transition metal carboxylate to the system to be treated. Suitable aromatic solvents may include but are not necessarily limited to toluene, xylenes, Aromatic 100 solvent, and the like.

Typical application of the transition metal carboxylate scavenger may involve the addition of between about 1 independently to about 50,000 ppm (by volume) of scavenger introduced or injected into the system or stream to be treated, in one non-restrictive version, but in another non-restrictive embodiment the amount of transition metal carboxylate scavenger may range between about 10 independently to about 10,000 ppm; in another non-limiting embodiment from about 25 independently to about 5,000 ppm; alternatively from about 50 independently to about 200 ppm. Alternatively, the addition of transition metal carboxylate scavenger may be at a rate of up to about 20 times the amount of contaminant present in the stream, e.g. mixed production system or mixture of water or predominately water and/or dry hydrocarbon gas and/or wet hydrocarbon gas; in another non-limiting embodiment, at a rate of up to about 10 times the amount of contaminant present. An acceptable lower level is a 1:1 stoichiometric ratio of scavenger to contaminant. Testing indicates that there is typically sufficient time and temperature for the desired reaction to occur. In any event, sufficient time and/or conditions should be permitted so that the transition metal carboxylate scavenger reacts with substantially all of the contaminant present. By "substantially all" is meant that no significant corrosion, odor and/or reactant problems occur due to the presence of the contaminant(s).

It will be understood that the complete elimination of corrosion, odor or other problems or complete removal of the contaminants is not required for successful practice of the method. All that is necessary for the method to be considered successful is for the treated hydrocarbon gas and predominantly mixed production system or stream to have reduced amounts of the contaminants as compared to an otherwise identical hydrocarbon and/or aqueous stream having no transition metal carboxylate scavenger, and/or a reduced corrosion capability as compared to an otherwise identical hydrocarbon gas and predominantly mixed production system or stream having an absence of the transition metal carboxylate scavenger. Of course, complete removal of a contaminant is an acceptable result.

The invention will now be described with respect to particular Examples that are not intended to limit the invention but simply to illustrate it further in various non-limiting embodiments. Unless otherwise noted, all percentages (%) are weight %, and all dosages are ppm by volume.

Results are provided for inventive Scavenger A product, which is a 16% zinc product as zinc octoate product in an aromatic solvent and conventional Scavenger B, which is an oil soluble amine formaldehyde reaction product.

$H_2S$ Scavenger Test

A CGF (continuous gas flow) test apparatus was designed around a pressure reactor with a glass reaction vessel. The test chamber contained fluid that was continuously sparged with $H_2S$-containing gas. The concentration of hydrogen sulfide at the outlet of the reaction vessel was measured with a solid state $H_2S$ analyzer. A custom built gas delivery system consisting of mass flow controllers delivered precise quantities of $H_2S$ containing gas to the reactor vessel. The flow rates of gases used in the experiments are provided in Table I:

TABLE I

| Gas Flow Rates | |
| --- | --- |
| Gas | Flow Rate (sccm) |
| 10% $H_2S$ in $N_2$ | 5.0 |
| $CO_2$ | 2.5 |
| $N_2$ | 125.0 |

Work was done with a synthetic brine with the composition provided in Table II:

TABLE II

| Synthetic Brine Used in Study | |
| --- | --- |
| | Concentration (mg/L) |
| Cations | |
| $Na^+$ | 68,000 |
| $K^+$ | 3,900 |
| $Mg_2^+$ | 1,200 |
| $Ca_2^+$ | 14,700 |
| $Sr_2^+$ | 1,500 |
| Anions | |
| $HCO_3^-$ | 300 |
| $SO_4^{2-}$ | 300 |
| $CH_3COO^-$ | 55 |
| $Cl^-$ | 138,693 |

In the experiments, gas is continuously sparged through the fluid until a steady state concentration is reached. At this point a specific amount of $H_2S$ scavenger is injected and the $H_2S$ concentration is monitored with time.

Example 1

The performance of Scavenger A was tested in brine and compared with a conventional oil soluble amine/formaldehyde reaction product $H_2S$ Scavenger B at 167° F. (75° C.). The comparative data are shown in FIG. 1 which presents the change in $H_2S$ concentration as a function of time with the injection of 200 ppm of Scavenger B and 140 ppm of Scavenger A in brine at 167° F. (75° C.).

From FIG. 1, it may be seen that an injection of 200 ppm of Scavenger B only reduces the $H_2S$ concentration in the experiment to 1800 ppm, while an injection of as little as 140 ppm of Scavenger A decreases the $H_2S$ concentration to below 500 ppm. From these experiments it may be concluded that one needs more than eight times more of the conventional Scavenger B (81 L/Kg $H_2S$) than the inventive Scavenger A (15 L/Kg $H_2S$) to scavenge the same amount of $H_2S$. The poor performance of Scavenger B is reflective of conventional H2S Scavengers in predominately water systems.

Example 2

The inventive Scavenger A has been compared with the conventional Scavenger B in a dry hydrocarbon gas pipeline system. The system was a 16-inch (41 cm) 30 mile (48 km) gas pipeline system in Western Oklahoma. The pipeline transports 100-120 mmscfd (1,970-2,360 m³/min). The inlet gas contains a few ppm of $H_2S$. Measurement of $H_2S$ concentration in the gas phase was done using direct reading detector tubes (Gastec 4LK) and a Q Rae II digital $H_2S$ meter. The Gastec 4 LK direct reading detector tube measures $H_2S$ concentrations in the range of 0 to 40 ppm $H_2S$ with a detection limit of 0.25 ppm.

Scavenger B has been traditionally used in this line. Information on its use on 6 days between Dec. 27, 2012 and Jan. 30, 2013 is provided in Table III below. The calculated specific consumption per pound of $H_2S$ scavenged using the $H_2S$ outlet concentration as measured with Gastec 4 LK is also provided in Table III.

TABLE III

Flow Rate, H₂S Inlet and Outlet Concentrations and Scavenger B Consumption

| Date | Flow Rate, mmscfd ($m^3$/min) | $H_2S_{in}$ (ppm) | Scavenger B, gal/day (L/day) | $H_2S_{out}$ (ppm) | Efficiency (gal/mmscfd ppm) | Consumption, gal/lb (L/kg) $H_2S$ |
|---|---|---|---|---|---|---|
| Dec. 27, 2012 | 107.9 (2122) | 2.5 | 90 (341) | 1.0 | 0.56 | 5.17 (43.1) |
| Jan. 7, 2013 | 147.6 (2902) | 2.6 | 90 (341) | 1 | 0.38 | 4.25 (35.4) |
| Jan. 11, 2013 | 136.8 (2690) | 2.3 | 90 (341) | 1 | 0.51 | 5.64 (47.0) |
| Jan. 14, 2013 | 136.8 (2690) | 2.1 | 90 (341) | 1 | 0.60 | 6.67 (55.6) |
| Jan. 22, 2013 | 128.7 (2531) | 2.1 | 76 (288) | 0.8 | 0.45 | 5.99 (49.9) |
| Jan. 30, 2013 | 118.3 (2326) | 2.8 | 73 (276) | 0.8 | 0.31 | 3.58 (28.9) |

It can be seen that at no time did the H₂S outlet concentration as measured with a Gastec 4LK gas detector tube read at zero. Specific consumption and efficiency was calculated using the H₂S outlet concentration as measured with the Gastec 4 LK gas detector. The efficiency of Scavenger B varied from 0.31 to 0.60 with an average of 0.47. The specific consumption of H₂S scavenger varied between 3.58 to 6.67 gallons (28.9 to 55.6 L/kg) of Scavenger A per pound of H₂S scavenged with an average of 5.22 (27.2 L/kg).

Scavenger A was tested between Jan. 16, 2013 and Jan. 22, 2013. The results obtained with the product are tabulated in Table IV below.

TABLE IV

Flow Rate, H₂S Inlet and Outlet Concentrations and Scavenger A Consumption

| Date | Flow Rate, mmscfd ($m^3$/min) | $H_2S_{in}$ (ppm) | Scavenger A, gal/day (L/day) | $H_2S_{out}$ (ppm) | Efficiency (gal)/ (mmscfd ppm) | Consumption, gal/lb (L/kg) $H_2S$ |
|---|---|---|---|---|---|---|
| Jan. 16, 2013 | 127.7 (2511) | 2.6 | 50 (189) | 0 | 0.15 | 1.68 (8.35) |
| Jan. 16, 2013 | 108.8 (2139) | 2.4 | 34.5 | 0.04 | 0.13 | 1.50 (7.83) |
| Jan. 17, 2013 | 130.5 (2566) | 2.8 | 34.5 (131) | 0.4 | 0.11 | 1.23 (6.42) |
| Jan. 17, 2013 | 130.5 (2566) | 2.6 | 40.5 (153) | 0.5 | 0.15 | 1.65 (8.61) |
| Jan. 21, 2013 | 130.9 (2574) | 2.3 | 39 (148) | 0.9 | 0.21 | 1.58 (8.25) |
| Jan. 22, 2013 | 135 (2656) | 2.1 | 47 (178) | 0.4 | 0.20 | 1.89 (9.87) |

It may be seen that when 50 gallons per day (189 L/day) of Scavenger A were used in the field trial, the gas concentration as measured with both a Gastec 4LK and 4 LT (more sensitive tube) went to zero. This result had not been obtained earlier with the Scavenger B. Efficiencies and specific consumption are calculated using the H₂S concentration measured with a Gastec 4 LK meter. The efficiency of Scavenger A varied between 0.11 to 0.21 with an average of 0.17. The specific consumption of HSO3507 per pound of H₂S scavenged varied between 1.23 to 1.89 gal/lb (6.42 to 9.87 L/kg) with an average of 1.59 gallons per pound (8.30 L/kg) of H₂S scavenged. These results indicate that 70% less of the HSO3507 scavenger may need used as compared with the Scavenger A to achieve similar levels of performance.

The scavengers of the compositions and methods described herein have been shown to be effective in wet or dry gas hydrocarbon or mixed production systems, and further did not exacerbate scaling and/or solid formation issues are often encountered with prior, conventional H₂S scavengers.

In the foregoing specification, the invention has been described with reference to specific embodiments thereof. The transition metal carboxylate scavenger of this method would be expected to be useful in other dry hydrocarbon gas, wet hydrocarbon gas, and/or predominantly water systems, i.e. mixed production systems, besides those explicitly mentioned. It will be evident that various modifications and changes can be made to the methods and compositions described herein without departing from the broader spirit or scope of the invention as set forth in the appended claims. Accordingly, the specification is to be regarded in an illustrative rather than a restrictive sense. For example, specific transition metal carboxylate scavengers, proportions thereof, mixed production systems, dry hydrocarbon gas systems, wet hydrocarbon gas systems, and contaminants falling within the claimed parameters, but not specifically identified or tried in particular compositions, are anticipated and expected to be within the scope of this invention.

The present invention may suitably comprise, consist or consist essentially of the elements disclosed and may be practiced in the absence of an element not disclosed. For instance, in a method for at least partially removing a contaminant from a system comprising, consisting essentially of or consisting of a mixed production system and/or a dry hydrocarbon gas and/or a wet hydrocarbon gas system, the method may consist of or consist essentially of contacting the system of water and hydrocarbon gas with a transition metal carboxylate scavenger in an effective amount to at least partially remove a contaminant from the system, where the contaminant is selected from the group consisting of H₂S, a mercaptan, a sulfide and combinations thereof, and at least partially removing the contaminant from the system.

Further, the system treated may consist of or consist essentially of water and a hydrocarbon gas, i.e. mixed production, or dry hydrocarbon gas, or wet hydrocarbon gas.

The words "comprising" and "comprises" as used throughout the claims, are to be interpreted to mean "including but not limited to" and "includes but not limited to", respectively.

What is claimed is:

1. A method for at least partially scavenging a contaminant from a system selected from the group consisting of wet hydrocarbon gas, and dry hydrocarbon gas, the method comprising:

contacting the system with a transition metal carboxylate scavenger in an effective amount to at least partially scavenge a contaminant from the system, where the contaminant is selected from the group consisting of $H_2S$, a mercaptan, a sulfide and combinations thereof, where a carboxylic acid complexed with the transition metal has 8 to 25 carbon atoms; and at least partially scavenging the contaminant from the system.

2. The method of claim 1 where the transition metal carboxylate scavenger comprises from about 10 to about 100 wt % transition metal carboxylate and about 90 to about 5 wt % aromatic solvent.

3. The method of claim 2 where the transition metal in the transition metal carboxylate is selected from the group consisting of zinc, iron, copper, cobalt, calcium, manganese, and combinations thereof.

4. The method of claim 2 where the transition metal carboxylate is selected from the group consisting of zinc octoate, zinc dodecanoate, zinc naphthenate, and combinations thereof.

5. The method of claim 1 where the effective amount of the transition metal carboxylate scavenger is from about 1 to about 50,000 ppm by volume based on the system.

6. The method of claim 1 where the system consists of dry hydrocarbon gas.

7. The method of claim 1 where the system consists of wet hydrocarbon gas.

8. A method for at least partially scavenging a contaminant from a system selected from the group consisting of wet hydrocarbon gas, and dry hydrocarbon gas, the method comprising:

contacting the system with a transition metal carboxylate scavenger in an amount from about 1 to about 50,000 ppm by volume based on the system, where the transition metal in the transition metal carboxylate is selected from the group consisting of zinc, iron, copper, cobalt, calcium, manganese, and combinations thereof, and where the contaminant is selected from the group consisting of $H_2S$, a mercaptan, a sulfide and combinations thereof, where a carboxylic acid complexed with the transition metal has 8 to 25 carbon atoms; and at least partially scavenging the contaminant from the system.

9. The method of claim 8 where the transition metal carboxylate scavenger comprises from about 10 to about 100 wt % transition metal carboxylate and about 90 to about 5 wt % aromatic solvent.

10. The method of claim 9 where the transition metal carboxylate is selected from the group consisting of zinc octoate, zinc dodecanoate, zinc naphthenate, and combinations thereof.

11. A system treated for a contaminant, where the system comprises a composition selected from the group consisting of wet hydrocarbon gas, and dry hydrocarbon gas, where:

the system comprises a contaminant selected from the group consisting of $H_2S$, a mercaptan, a sulfide and combinations thereof; and the system comprises a transition metal carboxylate scavenger in an effective amount to at least partially scavenge the contaminant from the system, where a carboxylic acid complexed with the transition metal has 8 to 25 carbon atoms.

12. The system of claim 11 where the transition metal carboxylate scavenger comprises from about 10 to about 100 wt % transition metal carboxylate and about 90 to about 5 wt % aromatic solvent.

13. The system of claim 12 where the transition metal in the transition metal carboxylate is selected from the group consisting of zinc, iron, copper, cobalt, calcium, manganese, and combinations thereof.

14. The system of claim 12 where the transition metal carboxylate is selected from the group consisting of zinc octoate, zinc dodecanoate, zinc naphthenate, and combinations thereof.

15. The system of claim 11 where the effective amount of the transition metal carboxylate scavenger is from about 1 to about 10,000 ppm by volume based on the system.

16. The system of claim 11 where the composition consists of dry hydrocarbon gas.

17. The system of claim 11 where the composition consists of wet hydrocarbon gas.

* * * * *